(12) United States Patent  
Hattori et al.

(10) Patent No.: US 7,443,087 B2  
(45) Date of Patent: Oct. 28, 2008

(54) POLYMER ACTUATOR

(75) Inventors: Tatsuya Hattori, Wako (JP); Pu Qian, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 10/576,241

(22) PCT Filed: Oct. 4, 2004

(86) PCT No.: PCT/JP2004/014610

§ 371 (c)(1), (2), (4) Date: Dec. 28, 2006

(87) PCT Pub. No.: WO2005/039034

PCT Pub. Date: Apr. 28, 2005

(65) Prior Publication Data

US 2007/0120450 A1    May 31, 2007

(30) Foreign Application Priority Data

Oct. 15, 2003   (JP)   ............... 2003-355580

(51) Int. Cl.  
*H01L 41/08*  (2006.01)

(52) U.S. Cl. .................. 310/800; 310/358; 310/339

(58) Field of Classification Search .............. 310/311, 310/358, 339, 800  
See application file for complete search history.

(56) References Cited

U.S. PATENT DOCUMENTS

| 5,250,167 | A | * | 10/1993 | Adolf et al. ............... 310/309 |
| 5,556,700 | A | * | 9/1996 | Kaneto et al. ............. 252/500 |
| 6,117,296 | A | * | 9/2000 | Thomson ................... 204/607 |
| 6,249,076 | B1 | * | 6/2001 | Madden et al. ........... 310/363 |

FOREIGN PATENT DOCUMENTS

| JP | 2003-152234 | 5/2003 |
| JP | 2003-170400 | 6/2003 |
| JP | 2004-260995 | 9/2004 |

OTHER PUBLICATIONS

Okamoto et al., Actuator Based on Doping/Unoping-Induced Volume Change in Anisotropic Polypyrrole Film, Thin Solid Films, vol. 393:383-387 (2001).*

Della Santa, A. et al., "Performance and work capacity of a polypyrrole conducting polymer linear actuator," Synthetic Metals, vol. 90:93-100 (1997.*

* cited by examiner

*Primary Examiner*—J. A San Martin  
(74) *Attorney, Agent, or Firm*—Lahive & Cockfield, LLP; Anthony A. Laurentano, Esq.

(57) ABSTRACT

A polymer actuator comprising a conductive powder compact comprising a conductive polymer and a dopant, an ion donor, a work electrode, and a counter electrode, whereby it contracts or extends when voltage is applied between the work electrode and the counter electrode.

16 Claims, 8 Drawing Sheets

POLYMER ACTUATOR

RELATED APPICATIONS

This application is a 35 U.S.C. 371 national stage filing of International Application No. PCT/JP2004/014610, filed 4 Oct. 2004, which claims priority to Japanese Patent Application No. 2003-355580filed on 15 Oct. 2003 in Japan. The contents of the aforementioned applications are hereby incorporated by reference.

FIELD OF THE INVENTION

The present invention relates to a polymer actuator generating large displacement and power, the displacement being able to be utilized at both contraction and extension.

BACKGROUND OF THE INVENTION

In the fields using electromagnetic motors such as robots, cutting machines, automobiles, etc., demand has been mounting to reduce the weight of driving systems. However, because the power densities of the electromagnetic motors depend on the weight of motors, the weight reduction of actuators utilizing the electromagnetic motors is limited. To obtain large power with reduced size and weight, actuators without using electromagnetic motors are desired.

As actuators which can be made smaller in size and weight, polymer actuators have recently been attracting much attention. Known as the polymer actuators are a gel actuator using a conductive polymer gel, a polymer membrane actuator using a conductive polymer membrane, etc.

In general, the conductive polymer membrane actuator comprises a conductive polymer membrane and metal electrodes formed thereon. The metal electrodes are formed on the surfaces of the conductive polymer membrane by such methods as chemical plating, electroplating, vapor deposition, sputtering, coating, pressure-bonding, welding, etc. When potential difference is provided to an assembly of a conductive polymer membrane and metal electrodes in a water-containing state, bending and deformation occur in the conductive polymer membrane, and they can be utilized as a driving force.

JP2003-152234A discloses an actuator comprising an electrolyte sandwiched by electrodes, whose shape changes when voltage is applied to the electrodes, each of the above electrodes being constituted by a conductive polymer, and a conductive material in electrical contact with the conductive polymer, the conductive material being in the form of powder, a net or a porous body. This actuator comprises a powdery conductive material layer, and a pair of conductive polymer membranes sandwiching the conductive material layer, the conductive material layer and the conductive polymer membrane being curved when electric current is supplied. It is described in JP2003-152234A that the conductive material in the form of powder, etc., can easily follow the shape change of the electrodes when voltage is applied, so that peeling does not occur when the conductive polymer layer is bent. However, because this actuator is displaced in a bent state, it is difficult to control the amount and position of displacement. In addition, though large power is generated when it contracts, only small power is generated when the polymer membrane extends. Accordingly, the displacement at the time of extension cannot be utilized, suggesting that this is not an efficient actuator.

JP2003-170400A discloses an actuator element comprising an anion-exchange resin molding, metal electrodes formed on the anion-exchange resin molding with insulation to each other, and conductive polymer membranes each formed on each metal electrode. In this actuator element, the conductive polymer membrane is formed on the metal electrode by an electrolytic polymerization method. When electric current is supplied between the metal electrodes, electric current flows through the anion-exchange resin molding sandwiched by the electrodes and through the conductive polymer membranes. The supply of electric current causes minus ions in the resin to migrate toward an anode, with water molecules also migrating together with the ions, so that the actuator element extends on the anode side. The conductive polymer membrane also extends by oxidation on the anode side and contracts by reduction on the cathode side. It is described in JP2003-170400A that the anion-exchange resin molding and the conductive polymer membranes synergistically generates large displacement.

In the actuator element described in JP2003-170400A, however, the electro-conductive polymer membrane is displaced by bending, resulting in difficulty in controlling the amount and position of displacement like in the actuator of JP2003-152234A, and the displacement at the time of extension cannot be utilized. In addition, the production of the conductive polymer membrane by electrolytic polymerization takes an extremely long period of time, thus costly.

OBJECTS OF THE INVENTION

Accordingly, an object of the present invention is to provide a polymer actuator mass-producible at a low cost, which can generate large displacement and power with easy control of displacement, the displacement being able to be utilized not only when a driver constituted by the conductive polymer contracts but also when it extends.

DISCLOSURE OF THE INVENTION

As a result of intense research in view of the above object, the inventors have found that an actuator comprising a conductive powder compact comprising a conductive polymer and a dopant, an ion donor, a work electrode, and a counter electrode generates large displacement and power not only when the powder compact contracts but also when it extends, so that displacement at both contraction and extension can be utilized, and that because the actuator generates linear displacement, the control of displacement, etc. is easy. The present invention has been completed based on such finding.

Thus, the polymer actuator of the present invention comprises a conductive powder compact comprising a conductive polymer and a dopant, an ion donor, a work electrode, and a counter electrode, whereby it contracts or extends when voltage is applied between the work electrode and the counter electrode.

The conductive polymer preferably has a conjugated structure. The conductive polymer having a conjugated structure is specifically at least one selected from the group consisting of polypyrrole, polythiophene, polyaniline, polyacetylene and their derivatives.

The ion donor contains an electrolyte. The ion donor preferably contains an amphiphatic compound. The ion donor is preferably in the form of a solution, a sol, a gel or a combination thereof. The ion donor and/or the dopant preferably functions as a binder for the powder compact.

It is preferable that the work electrode is in contact with the powder compact, and that the counter electrode is disposed in the ion donor at a position separate from the powder compact.

The powder compact is preferably immersed in the ion donor. The powder compact is preferably in a planar or columnar shape.

The amount of the conductive polymer in the conductive powder is preferably 1-99.9% by mass. The conductive polymer preferably has an average particle size of 10 nm to 1 mm. The conductive polymer preferably has electric resistance of $10^{-4}$ Ω to 1 MΩ.

DESCRIPTION OF THE PREFERRED EMBODIMENTS

Figure 1:
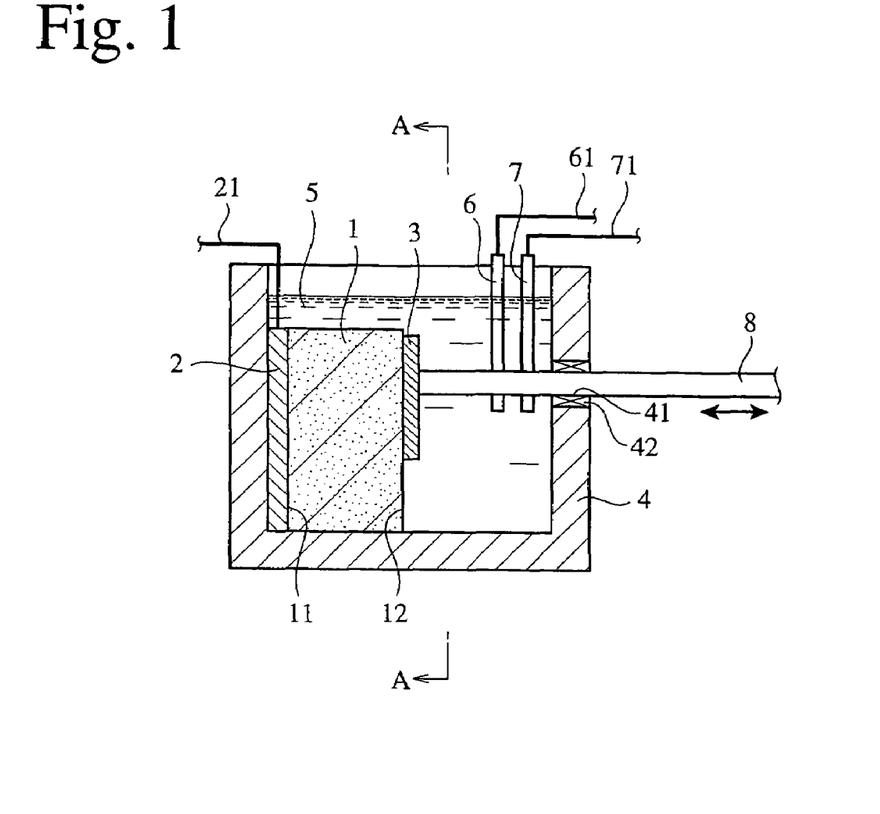
FIG. 1 is a vertical cross-sectional view showing one example of the polymer actuator of the present invention.
Figure 2:
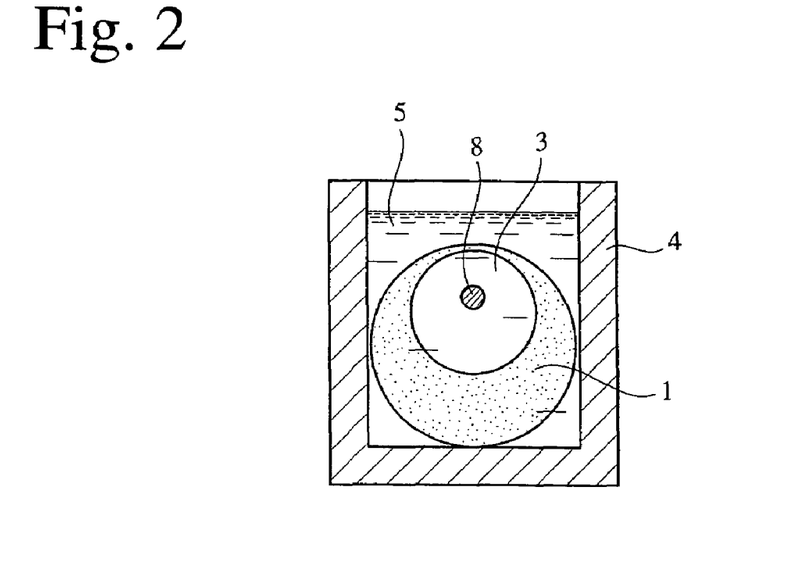
FIG. 2 is a cross-sectional view taken along the line A-A in FIG. 1.

FIGS. 1 and 2 show one example of the polymer actuator of the present invention. The polymer actuator shown in FIG. 1 comprises a conductive powder compact 1, a work electrode 2 bonded to a fixed end 11 of the powder compact 1, a movable plate 3 bonded to a driving end 12 of the powder compact 1, and a cell 4 containing the powder compact 1, the work electrode 2 and the movable plate 3. The powder compact 1, the work electrode 2 and the movable plate 3 are immersed in an ion donor 5 in the cell 4. A counter electrode 6 and a reference electrode 7 are also immersed in the ion donor 5.

The powder compact 1 is preferably in a planar shape. The powder compact 1 is preferably as thick as 0.1-20 mm. When it is thinner than 0.1 mm, it is easily broken, resulting in difficulty in handling. When it is thicker than 20 mm, the absorption and desorption of an electrolyte, etc. in the ion donor 5 are too slow, resulting in the powder compact 1 with poor response. Though the powder compact 1 is in a disc shape in FIGS. 1 and 2, it may be in a prism shape, etc.

The powder compact 1 can be produced by compressing a conductive powder, for instance, by charging the conductive powder into a tablet mold, evacuating the mold, and compressing it at 700-900 MPa for about 3-10 minutes. With the conductive powder compacted, the extension and contraction of the conductive powder occurring when electric current is supplied can be utilized as the displacement of the actuator. The conductive powder preferably has electric resistance of $10^{-4}$ Ω to 1 MΩ. The electric resistance of the conductive powder used herein is a value measured by a four-terminal method with electrode intervals of 1.5 mm. When the electric resistance is more than 1 MΩ, the conductive powder has too low conductivity, resulting in the actuator with poor efficiency. The conductive powder having electric resistance of less than $10^{-4}$ Ω cannot easily be produced.

The conductive powder contains a conductive polymer and a dopant. The powder compact 1 containing the conductive polymer and the dopant exhibits excellent conductivity. The conductive polymer preferably has a conjugated structure. The conductive polymer having a conjugated structure is more preferably at least one selected from the group consisting of polypyrrole, polythiophene, polyaniline, polyacetylene and their derivatives, particularly polypyrrole. The polypyrrole powder compact 1 exhibits large extension and contraction when electric current is supplied.

A usual dopant, p-type or n-type, may be used. Examples of the p-type dopants include halogens such as $Cl_2$, $Br_2$, $I_2$, ICl, $ICl_3$, IBr, $IF_3$, etc.; Lewis acids such as $PF_5$, $PF_6$, $BF_4$, $AsF_5$, $SbF_5$, etc.; inorganic acids such as sulfuric acid, nitric acid, perchloric acid, etc.; and organic acids such as p-toluene sulfonic acid, etc. Examples of the n-type dopants include alkali metals such as Li, Na, K, Rb, Cs, etc.; and alkaline earth metals such as Be, Mg, Ca, Sc, Ba, Ag, Eu, Yb, etc. The dopant preferably functions as a binder for the powder compact 1.

The amount of the conductive polymer in the conductive powder preferably 1-99.9% by mass, more preferably 30-70% by mass. When the conductive polymer is less than 1% by mass, the conductive powder absorbs and desorbs too small amounts of the electrolyte and water, resulting in the polymer actuator with too small displacement. When the conductive polymer is more than 99.9% by mass, the amount of the dopant such as a metal salt, etc. is too small to obtain enough conductivity. The conductive polymer has an average particle size of 10 nm to 1 mm. When it has an average particle size of more than 1 mm, the conductive polymer undesirably has too small an area with which it is in contact with the ion donor 5 such as an electrolytic solution, etc., resulting in the polymer actuator with too poor response. The conductive polymer having an average particle size of less than 10 nm cannot easily be produced and handled.

The conductive powder preferably contains, in addition to the conductive polymer and the dopant, at least one selected from the group consisting of metals other than the above-described metals (alkali metals and alkaline earths) for the n-type dopant, and their salts, and carbon. The conductive powder containing at least one selected from the group consisting of metals other than the dopant, and their salts, and carbon has large conductivity. The metals other than the dopant are preferably iron, copper, nickel, titanium, zinc, chromium, aluminum, cobalt, gold, platinum, silver, manganese, tungsten, palladium, ruthenium, and zirconium. Examples of the metal salts include iron trichloride and copper chloride.

The production method of the conductive powder will be explained below, taking a conductive powder containing a conductive polymer, a dopant and a metal salt for example. The conductive polymer can efficiently be synthesized by oxidation polymerization. When a monomer is dropped into an aqueous solution containing a dopant and a metal salt and stirred, the monomer is polymerized with the dopant and the metal salt taken thereinto. This provides a conductive polymer powder containing the dopant and the metal salt. The metal salt such as copper chloride, iron trichloride, etc. also functions as an oxidation polymerization catalyst. The metal salt is preferably dissolved in the aqueous solution, such that a molar ratio of the metal salt to the monomer is about 10/1 to 1/100.

The work electrode 2 in contact with the powder compact 1 and the cell 4 is connected to a lead wire 21. The work electrode 2 is preferably bonded to the fixed end 11 of the powder compact 1 and an inner surface of the cell 4. With the work electrode 2 bonded to the fixed end 11 and the cell 4, the powder compact 1 can return to the original position while contracting after extension. The work electrode 2 may be bonded to the powder compact 1 and the fixed end 11 by an adhesive. The work electrode 2 is preferably made of platinum, gold, silver, copper, nickel, stainless steel or carbon. The work electrode 2 is preferably as thick as 0.1 µm to 10 mm. The work electrode 2 can be formed on the powder compact 1 by chemical plating, electroplating, vapor deposition, sputtering, coating, pressure-bonding, welding, adhesion, etc.

The movable plate 3 is bonded to the driving end 12 of the powder compact 1. As shown in FIGS. 1 and 2, the movable plate 3 does not cover almost a lower half of the powder compact 1, lest that the movable plate 3 hinders the powder compact 1 from absorbing and desorbing the electrolyte, etc. in the ion donor 5. Although the movable plate 3 is in a disc shape in the example shown in FIGS. 1 and 2, the shape of the movable plate 3 is not particularly restrictive unless it hinders the powder compact 1 from absorbing and desorbing the electrolyte, etc. in the ion donor 5. A movable bar 8 is perpendicularly fixed to the movable plate 3 on the other side to the powder compact 1. The movable bar 8 penetrates through an opening 41 of the cell 4, and is movably supported by a bearing 42 disposed in the opening 41. When the powder compact 1 is driven by electric current supplied, the movable bar 8 moves. Accordingly, one end of the movable bar 8 is a driver part.

A box-shaped cell 4 contains the powder compact 1 vertically. The cell 4 has a slightly larger inner width (in the lateral direction in FIG. 2) than the outer diameter of the powder compact 1, so that the powder compact 1 can extend and contract in the cell 4. A flowable ion donor 5 is filled in the cell 4. The opening 41 is sealed lest that the ion donor 5 leaks through the opening 41.

The ion donor 5 contains an electrolyte. Examples of the electrolytes include sodium chloride, $NaPF_6$, sodium p-toluene sulfonate and sodium perchlorate. The ion donor 5 preferably contains a polymer soluble in an organic solvent or water, more preferably a polymer soluble in an organic solvent and water. Preferred examples of the polymers include polyethylene glycol and polyacrylic acid. The electrolyte and/or polymer in the ion donor 5 also preferably functions as a binder for the powder compact 1.

The ion donor 5 should have such flowability as not to hinder the extension and contraction of the powder compact 1. The ion donor 5 is preferably in the form of a solution, a sol, a gel, a mixture of a solution and a sol, a mixture of a sol and a gel, or a mixture of a solution and a gel. The ion donor 5 in the form of a sol, a gel or a mixture thereof is preferable because of no leakage. A solvent and/or a dispersing medium for the ion donor 5 is preferably water. When the solvent and the dispersing medium are water, the ion donor 5 has large conductivity. The concentration of an aqueous electrolyte solution is preferably about 0.01-5 mol/L.

The ion donor preferably contains an amphiphatic compound. It may contain an amphiphatic polymer such as polyethylene glycol and polyacrylic acid, or may contain an amphiphatic compound in addition to the electrolyte and the polymer. The ion donor 5 containing the amphiphatic compound has such large affinity for the powder compact 1 that it can easily be absorbed in and desorbed from the powder compact 1. Accordingly, the inclusion of the amphiphatic compound in the ion donor 5 improves the response of the actuator.

The counter electrode 6 is connected to a lead wire 61, and the reference electrode 7 is connected to a lead wire 71. The counter electrode 6 and the reference electrode 7 may be those generally used. Materials for the counter electrode 6 and/or the reference electrode 7 may be platinum, gold, silver, copper, nickel, stainless steel, carbon, etc.

Figure 3:
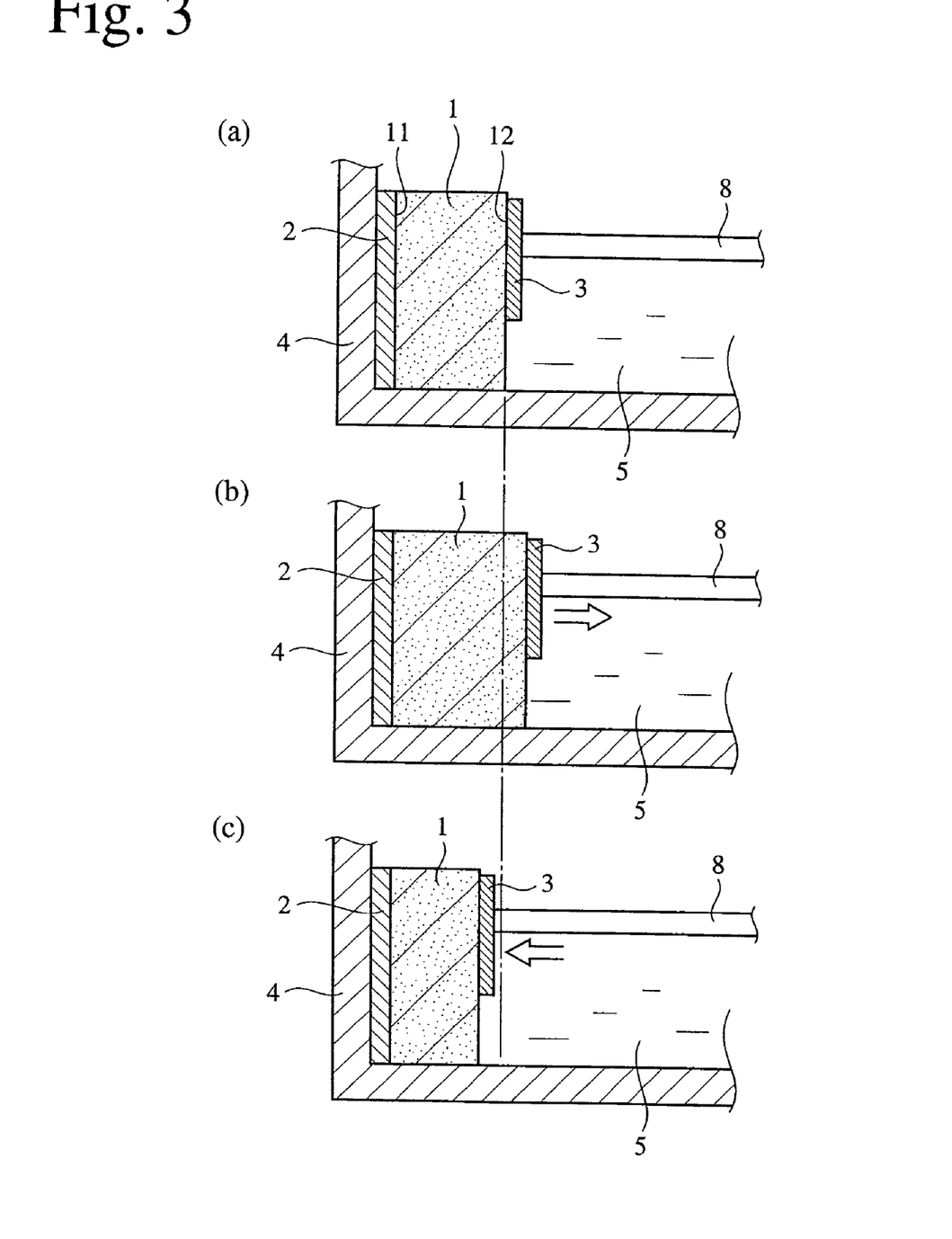
FIG. 3 is a cross-sectional view showing an extendable and contractible powder compact in the polymer actuator, in which (a) shows the powder compact to which current is not supplied, (b) shows the extended powder compact, and (c) shows the contracted powder compact.

When electric current is supplied between the work electrode 2 and the counter electrode 6, the powder compact 1 extends or contracts, thereby moving the movable bar 8 fixed to the movable plate 3. When electric current is supplied such that the work electrode 2 becomes positive at a position shown in FIG. 3(a), at which no electric current is supplied, the powder compact 1 extends to move the movable bar 8 rightward in the figure [FIG. 3(b)]. When electric current is supplied such that the work electrode 2 becomes negative, the powder compact 1 contracts to move the movable bar 8 leftward in the figure [FIG. 3(c)]. It is considered that such extension and contraction of the powder compact 1 occurs because when electric current is supplied, the conductive polymer in the powder compact 1 is oxidized to absorb the electrolyte, the solvent, etc. in the ion donor 5, or reduced to desorb them. How the powder compact 1 extends and contracts may change depending on the types of the conductive polymer in the powder compact 1 and the electrolyte, etc. in the ion donor 5, and their combinations.

Figure 4:
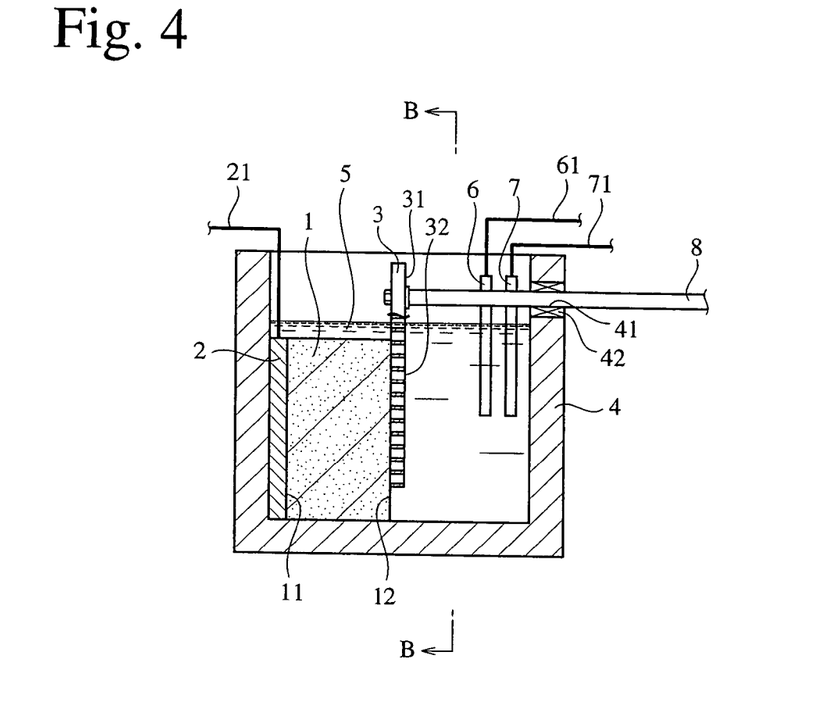
FIG. 4 is a vertical cross-sectional view showing another example of the polymer actuator of the present invention.
Figure 5:
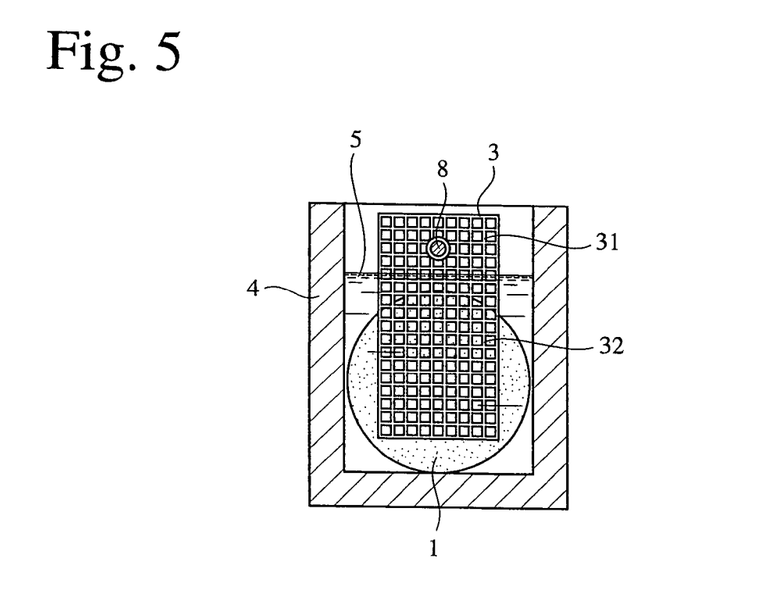
FIG. 5 is a cross-sectional view taken along the line B-B in FIG. 4.

The polymer actuator shown in FIGS. 4 and 5 is substantially the same as shown in FIGS. 1-3, except that a movable plate 3 is fixed to a powder compact 1 such that its upper portion 31 projects from an ion donor 5. Accordingly, only differences will be explained below. As shown in FIGS. 4 and 5, a lower portion 32 of the movable plate 3 is fixed to the powder compact 1. The movable plate 3 is in a net shape, so that it does not prevent the powder compact 1 from absorbing and desorbing the ion donor 5. The movable plate 3 moves in response to the extension and contraction of the powder compact 1.

The movable bar 8 is fixed to the upper portion 31 of the movable plate 3. A cell 4 has an opening 41 for horizontally supporting a movable bar 8 at a position higher than the powder compact 1 and a surface of the ion donor 5. Thus, even if a liquid ion donor 5 is used with the powder compact 1 entirely immersed in the ion donor 5 in the cell 4, there is no need of sealing the opening 41. Accordingly, there is only small friction resistance generated in the opening 41 when the movable bar 8 moves.

When electric current is supplied between the work electrode 2 and the counter electrode 6, the conductive polymer in the powder compact 1 absorbs or desorbs the ion donor 5, so that the powder compact 1 extends or contracts to move the movable bar 8 fixed to the movable plate 3. With the net-shaped movable plate 3, the powder compact 1 has a large contact area with the ion donor 5, thereby quickly absorbing or desorbing the electrolyte, the solvent, etc. in the ion donor 5. Accordingly, the powder compact 1 quickly extends and contracts, resulting in excellent response.

Figure 6:
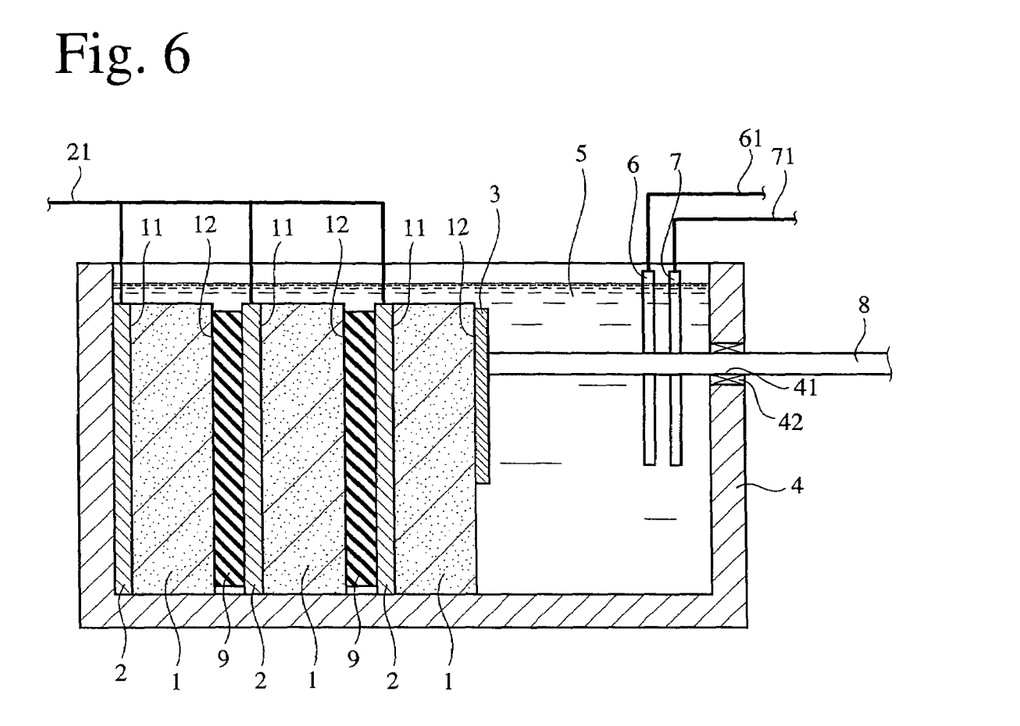
FIG. 6 is a vertical cross-sectional view showing a further example of the polymer actuator of the present invention.

The example shown in FIG. 6 is substantially the same as shown in FIGS. 1-3, except that pluralities of work electrodes 2 and powder compacts 1 are laminated in a cell 4. Accordingly, only differences will be explained below. In the example shown in FIG. 6, three work electrodes 2 and three powder compacts 1 are contained in one cell 4, though not restrictive. The numbers of the work electrodes 2 and the powder compacts 1 contained in one cell 4 may respectively be 2, or 4 or more.

Two sets of work electrodes 2, powder compacts 1 and planar insulators 9 are laminated in this order, and another work electrode 2 and another powder compact 1 are laminated in the cell 4. Each powder compact 1 has a fixed end 11 bonded to each work electrode 2, and a driving end 12a bonded to each insulator 9. Each insulator 9 is bonded to each work electrode 2. Accordingly, with the powder compact 1 contracting after extension by the supply of electric current, all the powder compacts 1 and the work electrodes 2 can return to the original position. A movable plate 3 is fixed to a driving end 12 of the powder compact 1 on the side of a counter electrode 6. Because the width of the insulator 9 is slightly smaller than the width (in a depth direction in FIG. 6) of the cell 4, the insulator 9 is not in contact with the cell 4. Accordingly, there is no friction between the insulator 9 and the cell 4 when the powder compact 1 extends and contracts.

When electric current is supplied between each work electrode 2 and the counter electrode 6, each powder compact 1 extends or contracts by absorbing or desorbing the ion donor 5, so that the movable bar 8 fixed to the movable plate 3 moves. This polymer actuator provides large displacement, because pluralities of powder compacts 1 are laminated.

This polymer actuator is also faster in the absorption and desorption of the ion donor 5 by the powder compact 1 than a polymer actuator having one thick powder compact 1, resulting in excellent response.

The present invention will be explained in more detail referring to Examples below without intention of restricting the present invention thereto.

EXAMPLE 1

(1) Preparation of Polypyrrole Powder 3 g of iron trichloride, 1 g of copper chloride, and 3.6 g of sodium p-toluene sulfonate were dissolved in 100 mL of water. While stirring the resultant solution at room temperature, 1 g of pyrrole was slowly dropped. After stirring for 2 hours after the completion of dropping, the resultant black precipitate was filtered out, and washed with ethanol and distilled water in this order to obtain polypyrrole powder. Voltage-resistance measurement revealed that the polypyrrole powder had resistance of 20 Ω.

(2) Preparation of Polypyrrole Powder Compact

The polypyrrole powder containing iron trichloride, copper chloride and sodium p-toluene sulfonate, which was produced in the above step (1), was charged into an IR tablet mold having a diameter of 10 mm, and compressed at a pressure of 748-873 MPa for 5 minutes while evacuating the tablet mold, to form a polypyrrole powder compact 1. The powder compact 1 had a thickness of 0.5 mm. Voltage-resistance measurement revealed that the powder compact 1 had resistance of 0.2 Ω.

Figure 7:
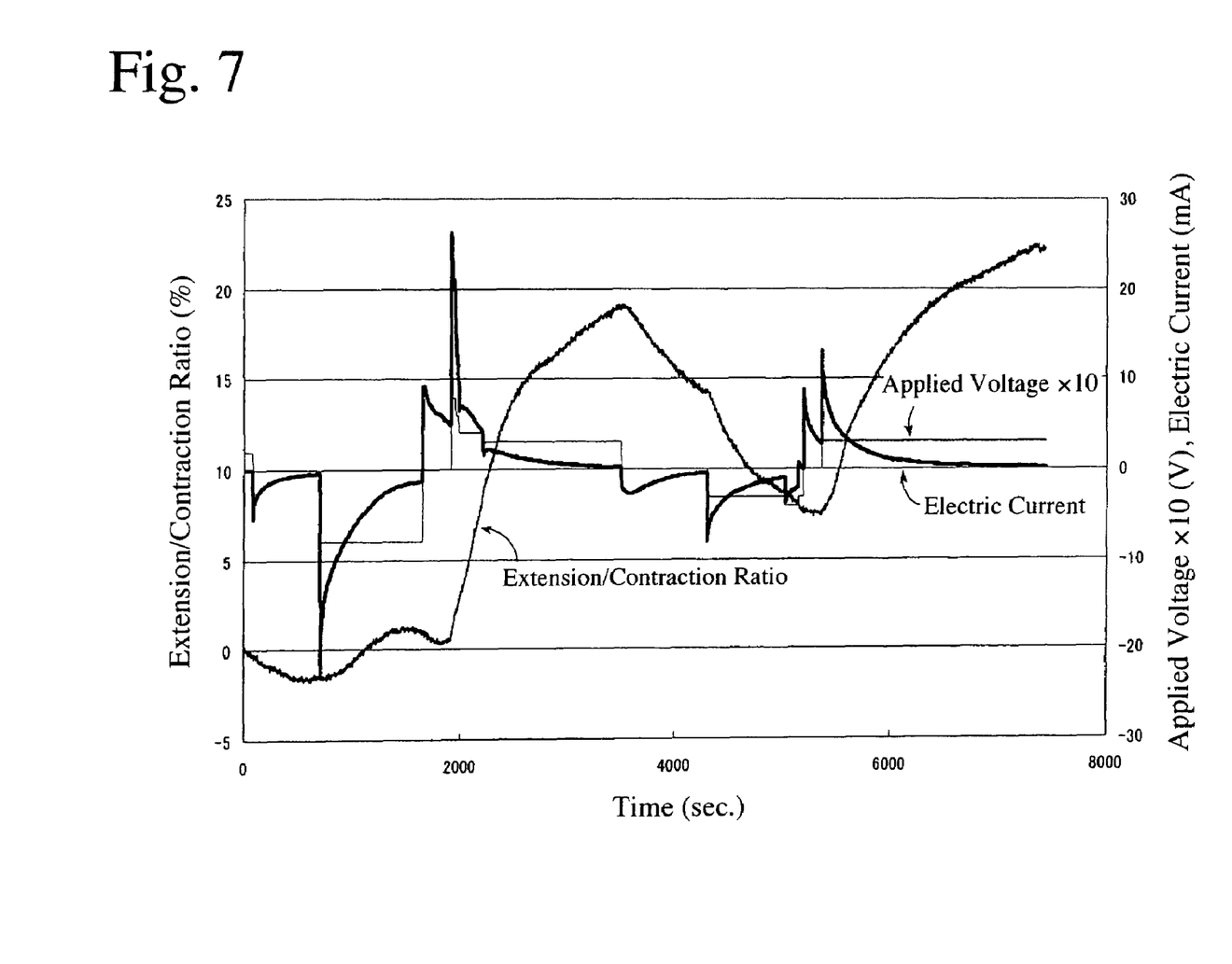
FIG. 7 is a graph showing the change of electric current and an extension/contraction ratio with time in the actuator of Example 1 when voltage was applied.

(3) Assembling of actuator, and measurement of electric current and extension/contraction ratio A platinum foil 2 having a thickness of 30 μm was attached to one surface of this polypyrrole powder compact, and connected to a lead wire 21. The resultant assembly was used to produce the actuator shown in FIGS. 1 and 2, and voltage was applied to measure electric current and an extension/contraction ratio (displacement). The measurement conditions were as described below. The results are shown in FIG. 7. The maximum displacement ratio of the powder compact was about 20%.

Ion donor: Aqueous solution of $NaPF_6$ (1 mol/L),
Work electrode: Platinum foil,
Counter electrode: Platinum wire,
Work electrode: silver wire, and
Applied voltage: −0.3 V to +0.3 V.

Figure 8:
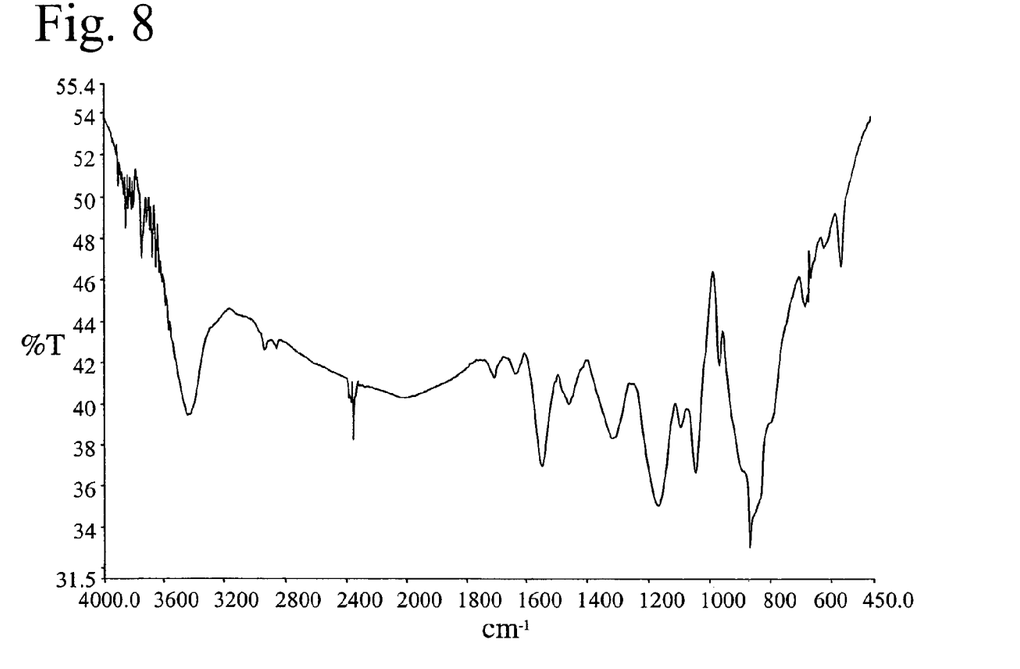
FIG. 8 is a graph showing the infrared spectrum of a polypyrrole powder compact in an oxidized state.
Figure 9:
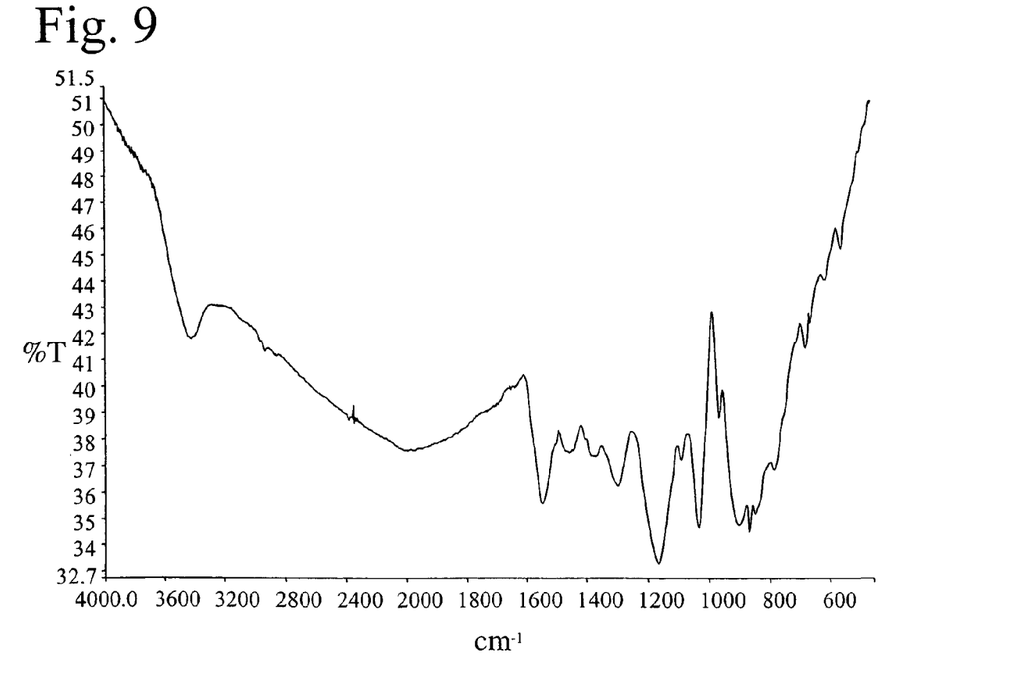
FIG. 9 is a graph showing the infrared spectrum of the polypyrrole powder compact in a reduced state.

The polypyrrole powder compact 1 in an oxidized state was then taken out of the cell, and subjected to infrared spectrum measurement. After the measurement, the polypyrrole powder compact 1 was charged into the cell 4 again, and turned to a reduced state to carry out infrared spectrum measurement. The infrared spectrum measurement results in oxidized and reduced states are shown in FIGS. 8 and 9, respectively. As shown in FIG. 8, there were peaks at $1630\ cm^{-1}$ and $830\ cm^{-1}$ in the spectrum in the oxidized state. These peaks were substantially in agreement with those of $NaPF_6$, an electrolyte in the ion donor, suggesting that the polypyrrole powder compact turned to an oxidized state absorbed the ion donor.

EXAMPLE 2

The polypyrrole powder produced in the same manner as in the step (1) of Example 1 was charged into an IR tablet mold, to form a polypyrrole powder compact 1 in the same manner as in the step (2) of Example 1 except for changing the thickness of the powder compact 1 to 1 mm. The polypyrrole powder compact 1 was divided to two parts, one of which was attached to a platinum foil. These two powder compact parts were laminated with the platinum foil outside, and charged into a cell 4 to produce an actuator. The resultant actuator had the same structure as that shown in FIGS. 1 and 2 except for having a half-disc-shaped, laminated powder compact 1.

Figure 10:
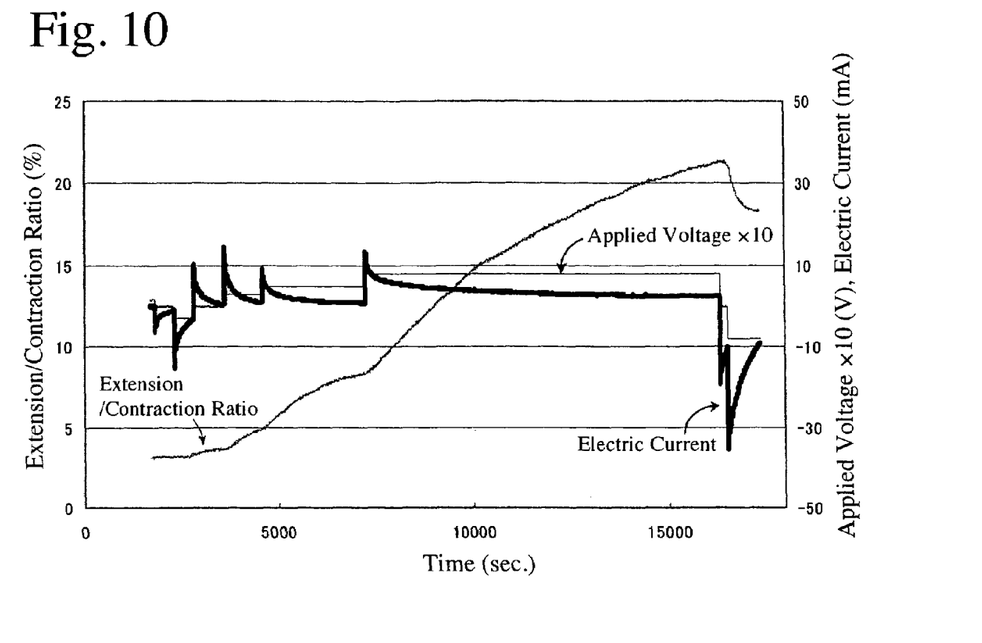
FIG. 10 is a graph showing the change of electric current and an extension/contraction ratio with time in the actuator of Example 2 when voltage was applied.

Voltage was applied to the actuator to measure electric current and an extension/contraction ratio. The measurement conditions are as described below. The results are shown in FIG. 10. The maximum extension/contraction ratio of the powder compact was about 20%.

Ion donor: Aqueous solution of $NaPF_6$ (1 mol/L),
Work electrode: Platinum foil,
Counter electrode: Platinum wire,
Reference electrode: Silver wire, and
Applied voltage: −0.8 V to +0.8 V.

Figure 11:
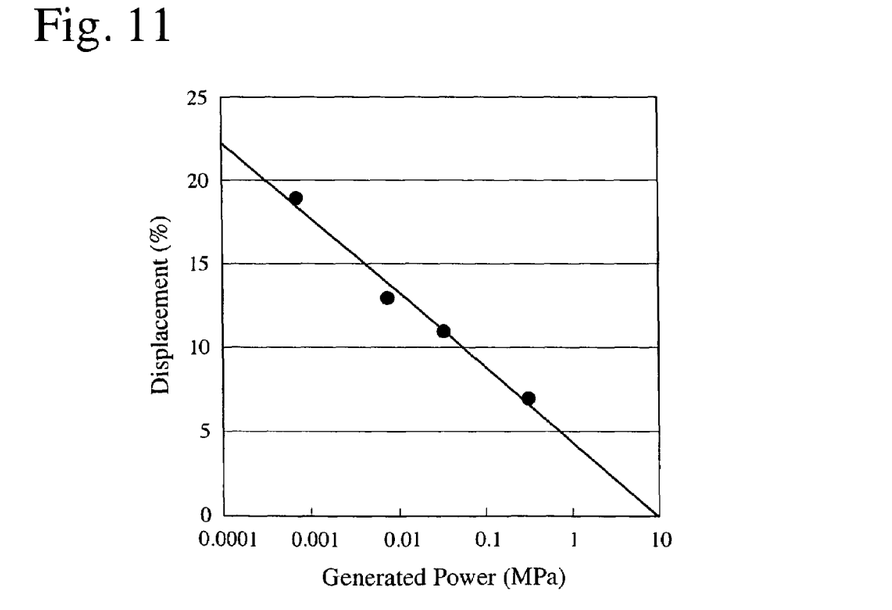
FIG. 11 is a graph showing power generated by the actuator of Example 2.

With a weight attached to a tip end of a movable bar of the actuator, electric current was supplied between the work electrode 2 and the counter electrode 6 to measure the extension/contraction ratio. With various weights, electric current was supplied between the electrodes to measure a load and the extension/contraction ratio. The measurement results are shown in FIG. 11. FIG. 11 indicates that the maximum power generated (at displacement of 0%) was 9.5 MPa.

EXAMPLE 3

Voltage in a range of −0.8 V to +1.2 V was applied to the actuator produced in Example 1 to measure the change of electric current and an extension/contraction ratio with voltage. First, voltage was changed from a self-potential of about 0.3 V to −0.8 V and then to +1.2 V, and returned to −0.8 V, and this cycle was repeated twice. The voltage-changing speed was 20 mV/sec.

Figure 12:
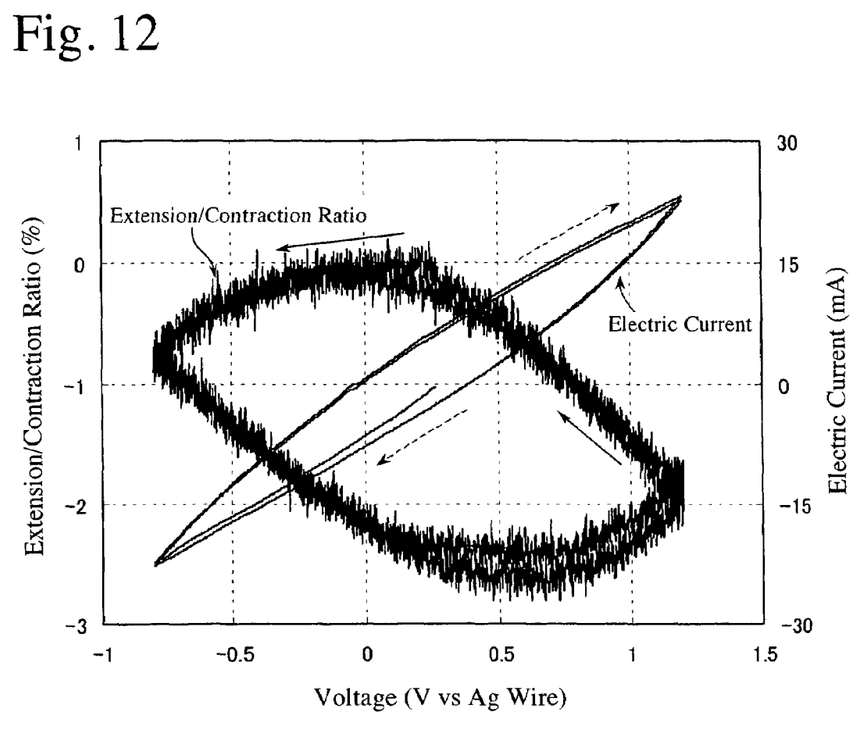
FIG. 12 is a graph showing the relation of electric current and an extension/contraction ratio to the applied voltage in the actuator of Example 3.

Ion donor: Aqueous solution of $NaPF_6$ (1 mol/L),
Work electrode: Platinum foil,
Counter electrode: Platinum wire,
Work electrode: Silver wire, and
Applied voltage: −0.8 to +1.2 V The measurement results of the electric current and the extension/contraction ratio are shown in FIG. 12. In FIG. 12, the broken-line arrow indicates the direction of the electric current change, and the solid-line arrow indicates the direction of the extension/contraction ratio change. As shown in FIG. 12, there was substantially no difference in the measured electric current and extension/contraction ratio between the first and second cycles. It is thus clear that even after repeated use, this actuator suffers little decrease in displacement, conductivity, etc.

EFFECT OF THE INVENTION

The polymer actuator of the present invention comprises a conductive powder compact comprising a conductive polymer and a dopant, an ion donor, a work electrode, and a counter electrode. When voltage is applied between the work electrode and the counter electrode, the conductive powder absorbs and desorbs the ion donor, so that the powder compact extends and contracts. Accordingly, the polymer actuator generates large displacement and power, and because the displacement is linear, it can easily be controlled. Also, the powder compact, a driver, does not easily peel off from the electrode, and does not deteriorate even after repeated use. Because the powder compact generates large power not only when it contracts but also when it extends, the displacement at the time of extension can be utilized. Further, because the powdery conductive polymer can be formed by oxidation polymerization, the polymer actuator of the present invention can be mass-produced at a low cost.

What is claimed is:

1. A polymer actuator comprising a conductive powder compact comprising a conductive polymer and dopant, an ion donor, a work electrode, and a counter electrode, whereby it contracts or extends when voltage is applied between said work electrode and said counter electrode, wherein said powder compact is in a planar or columnar shape.

2. The polymer actuator according to claim 1, wherein said conductive polymer has a conjugated structure.

3. The polymer actuator according to claim 1, wherein said conductive polymer is at least one selected from the group consisting of polypyrrole, polythiophene, polyaniline, polyacetylene and their derivatives.

4. The polymer according to claim 1, wherein said ion donor contains an electrolyte.

5. The polymer actuator according to claim 1, wherein said ion donor is in the form of a solution, a sol, a gel or a combination thereof.

6. The polymer actuator according to claim 1, wherein said ion donor contains an amphiphatic compound.

7. The polymer actuator according to claim 1, wherein said ion donor has a binder function.

8. The polymer actuator according to claim 1, wherein said dopant has a binder function.

9. The polymer actuator according to claim 1, wherein said work electrode is in contact with said powder compact, and wherein said counter electrode is disposed in said ion donor at a position separate from said powder compact.

10. The polymer actuator according to claim 1, wherein said conductive powder has electric resistance of $10^{-4}$ Ω to 1 MΩ.

11. The polymer actuator according to claim 1, wherein the amount of said conductive polymer in said conductive powder is 1-99.9% by mass.

12. The polymer actuator according to claim 1, wherein said conductive polymer has an average particle size of 10 nm to 1 mm.

13. The polymer actuator according to claim 1, further comprising a movable plate fixed to a side of said conductive powder compact, said movable plate being capable of displacing linearly in response to an extension or a contraction of said conductive powder compact caused by an absorption or a desorption of said ion donor in said conductive powder compact, when voltage is applied between said work electrode and said counter electrode.

14. The polymer actuator according to claim 1, further comprising a movable bar and a movable plate, wherein said movable bar is perpendicularly fixed to said movable plate on a side of said conductive powder compact, said movable bar being capable of moving in a horizontal direction, when said conductive powder compact is driven by a supplied electric current.

15. The polymer actuator according to claim 1, further comprising a movable bar, a movable plate and a cell, wherein said movable bar is perpendicularly fixed to an upper portion of said movable plate in a net shape fixed to a side of said conductive powder compact such that the upper portion of said movable plate projects from the ion donor and said cell has an opening for horizontally supporting said movable bar at a position higher than said conductive powder compact and a surface of said ion donor, said movable bar being capable of moving in a horizontal direction, when said conductive powder compact is driven by a supplied electric current.

16. The polymer actuator according to claim 1, further comprising:
   additional work electrodes and conductive powder compacts, a plurality of planar insulators, a movable bar, a movable plate and a cell;
   wherein a plurality of sets of said work electrodes, powder compacts and planar insulators are laminated in the order work electrode, powder compact, and planar insulator;
   wherein another work electrode and another conductive powder compact are laminated in said cell, where each conductive powder compact has a fixed end bonded to each work electrode, and a driving end bonded to each insulator, and each insulator is bonded to each work electrode;
   wherein said movable bar is perpendicularly fixed to said movable plate and said movable bar is fixed to the driving end of said conductive powder compact on a side of the counter electrode, where a width of said insulator is smaller than a width of said cell; and
   said movable bar penetrates through an opening of said cell and is movably supported by a bearing disposed in the opening thereof, said movable bar being capable of moving in a horizontal direction when said conductive powder compact is driven by a supplied electric current.

* * * * *